(12) United States Patent
Chang et al.

(10) Patent No.: US 9,473,667 B2
(45) Date of Patent: Oct. 18, 2016

(54) APPARATUS AND METHOD FOR CAPTURING IMAGE WITH AUDIO DATA

(71) Applicant: Samsung Electronics Co., Ltd, Gyeonggi-do (KR)

(72) Inventors: Min-Young Chang, Seoul (KR); Sung-Dae Cho, Gyeonggi-do (KR); Ji-Hwan Choe, Gyeonggi-do (KR); Oh-Yoon Kwon, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/149,706

(22) Filed: Jan. 7, 2014

(65) Prior Publication Data

US 2014/0192230 A1    Jul. 10, 2014

(30) Foreign Application Priority Data

Jan. 7, 2013    (KR) .................... 10-2013-0001615

(51) Int. Cl.
*H04N 1/32*    (2006.01)
*H04N 1/21*    (2006.01)
*H04N 101/00*    (2006.01)

(52) U.S. Cl.
CPC ........ *H04N 1/2112* (2013.01); *H04N 1/32101* (2013.01); *H04N 2101/00* (2013.01); *H04N 2201/3264* (2013.01); *H04N 2201/3277* (2013.01)

(58) Field of Classification Search
CPC .......... H04N 1/2112; H04N 1/32101; H04N 2101/00; H04N 2201/3264; H04N 2201/3277
USPC ............... 348/231.4, 207.99, 207.1; 396/264
See application file for complete search history.

(56) References Cited

U.S. PATENT DOCUMENTS

| | | | |
|---|---|---|---|
| 2002/0024604 A1* | 2/2002 | Ejima et al. .................. | 348/232 |
| 2004/0041934 A1* | 3/2004 | Shibutani ................. | 348/333.01 |
| 2004/0179091 A1* | 9/2004 | Aoike ......................... | 348/14.02 |
| 2006/0193624 A1* | 8/2006 | Mino et al. .................. | 396/312 |
| 2009/0225173 A1* | 9/2009 | Ogawa ..................... | 348/207.99 |
| 2012/0297466 A1 | 11/2012 | Li | |
| 2014/0009640 A1* | 1/2014 | Keesy et al. ............... | 348/231.4 |
| 2014/0191977 A1* | 7/2014 | Feng ....................... | G06F 3/018 345/173 |

FOREIGN PATENT DOCUMENTS

KR    10-2001-0104867    11/2001

* cited by examiner

*Primary Examiner* — Mekonnen Dagnew

(57) ABSTRACT

A method for capturing an image with audio data includes recording and storing audio data, capturing an image on request, and matching and storing the recorded audio data with the captured image, thereby allowing a user to more lively record an audio signal when an image is captured. An apparatus for capturing an image with audio data includes a camera unit configured to capture an image, an audio data recording unit configured to record audio data, and a controller configured to store an image captured by the camera unit, and match and store audio data recorded by the audio data recording unit for a predetermined period of time after the camera unit captured the image.

16 Claims, 11 Drawing Sheets

APPARATUS AND METHOD FOR CAPTURING IMAGE WITH AUDIO DATA

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jan. 7, 2013, and assigned Serial No. 10-2013-0001615, the entire disclosure of which is incorporated herein by reference.

TECHNICAL FIELD

The present disclosure relates to an image capture apparatus and method for recording audio in capturing an image, and matching and storing the recorded audio and captured image.

BACKGROUND

Currently, mobility based portable terminals are widely used. Among them, cellular phones in particular are so popular that the majority of the population uses them. Recent portable terminals including such cellular phones provide not only mobile telecommunication functionality but also various user-friendly options, such as image capturing, audio file reproducing, audio recording functions, and the like. With such portable terminals, users may enjoy various functions. For example, in an image capture mode selected by the user, the portable terminal captures and stores images at the user's request.

Portable terminals have thus far captured images on request in the image capture mode.

Typically, in the image capture mode, the portable terminal only captures an image without delivering an atmosphere of the scene from which the image was captured.

In order to feel such an atmosphere of the scene, the user generally uses cumbersome camcorder function of recording video image of the scene.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary object to provide an apparatus and method for recording audio data to deliver an atmosphere of a scene while capturing an image of the scene and for matching and storing the recorded audio data and the captured image.

In accordance with an aspect of the present disclosure, provided is an apparatus for capturing an image with audio data, the apparatus including a camera unit for capturing an image, an audio data recording unit for recording audio data, and a controller for controlling the audio data recording unit to record audio data and matching and storing the audio data with the image captured by the camera unit.

In accordance with another aspect of the present disclosure, provided is an apparatus for capturing an image with audio data, the apparatus including a camera unit for capturing an image; an audio data recording unit for recording audio data, and a controller for storing an image captured by the camera unit, and matching and storing audio data recorded by the audio data recording unit for a predetermined period of time after the image is captured with the captured image.

In accordance with another aspect of the present disclosure, provided is a method for capturing an image with audio data, the method including: recording and storing audio data; capturing an image on request, and matching and storing the recorded audio data with the captured image.

In accordance with another aspect of the present disclosure, provided is a method for capturing an image with audio data, the method including: capturing and storing an image; recording and storing audio data for a predetermined period of time after the image is captured; and matching and storing the recorded audio data with the captured image.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The above and other features and advantages of the present disclosure will become more apparent by describing in detail exemplary embodiments thereof with reference to the attached drawings in which.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
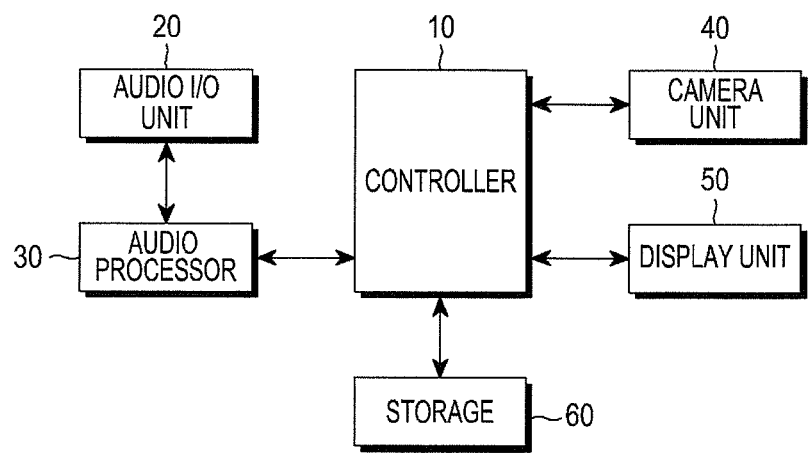
FIG. 1 is a block diagram of an apparatus for capturing an image with audio data according to an embodiment of the present disclosure.

FIG. 1 is a block diagram of an apparatus for capturing an image with audio data, according to an exemplary embodiment of the present disclosure.

The apparatus includes a controller 10, an audio recording unit for audio recording which consists of an audio input/output (I/O) unit 20 and an audio processor 30, a camera unit 40, a display unit 50, and a storage 60.

The controller 10 controls general operations of the apparatus, i.e., the audio I/O unit 20, the audio processor 30, the camera unit 40, the display unit 50, and the storage 60.

More specifically, the controller 10 controls the audio processor 30 to process an audio signal input through the audio I/O unit 20 for a certain period of time while in a photo capture mode into audio data and stores the audio data in a buffer of the storage 60. When an image is captured by the camera unit 40 in the photo capture mode, the controller 10 matches and stores data of the captured image and audio data stored in the buffer. In this regard, the controller may match and store audio data that has been stored for a predetermined period of time before the image is captured with the image data. Alternatively, the controller 10 can match and store audio data that has been stored for the predetermined period of time before the image is captured, plus a certain time after the image is captured with the image data. In another exemplary embodiment, the controller 10 can match and store a piece of audio data selected by the user from among one or more pieces of audio data stored beforehand with the image data.

In matching and storing the audio data with the image data, the controller 10 can include the audio data in a predetermined field of a format of the image data. In an example where the image data is in the JPEG file format, the controller 10 can store the audio data by inserting the audio data into an Exchangeable Image File (EXIF) field within the header field of the JPEG file format of the image data. In another example, the controller 10 can store the audio data by including position information of the audio data in a predetermined field of the image data format. More specifically, the controller 10 inserts the position information of the audio data into the EXIF field of the JPEG file format of the image data and inserts the audio data next to a data field of the JPEG file format. If the image data is in another format instead of the JPEG file format, the controller 10 can insert an identifier between the image data and the audio data to identify the audio data because an EXIF field does not exist.

The controller 10 then displays the image data stored with corresponding audio data in the display unit 50 on request, and reproduces the corresponding audio data through the audio I/O unit 20. While displaying the image data, the controller 10 can further display an indicator to indicate that the image data has audio data. In the above embodiment, it is illustrated that audio data is reproduced while the image data is displayed. In another embodiment, the controller 10 displays the image data with the indicator when requested to display the image data, and can reproduce the audio data on request. For example, having detected a touch input on a screen in which the indicator is displayed with the image data, the controller 10 can reproduce corresponding audio data stored with the image data.

The audio I/O unit 20 includes a microphone for forwards an input audio signal to the audio processor 30 and a speaker for outputting an audio signal processed by the audio processor 30.

The audio processor 30 can process an audio signal into audio data or process audio data into an audio signal.

The camera unit 40 includes front and rear cameras to capture images or videos.

The display unit 50 displays various menus for functions to be performed in the apparatus as well as user-input information or various information for the user.

The storage 60 includes an audio buffer for storing one or more pieces of audio data. Especially, the audio buffer stores audio data received in the image capture mode.

Figure 2:
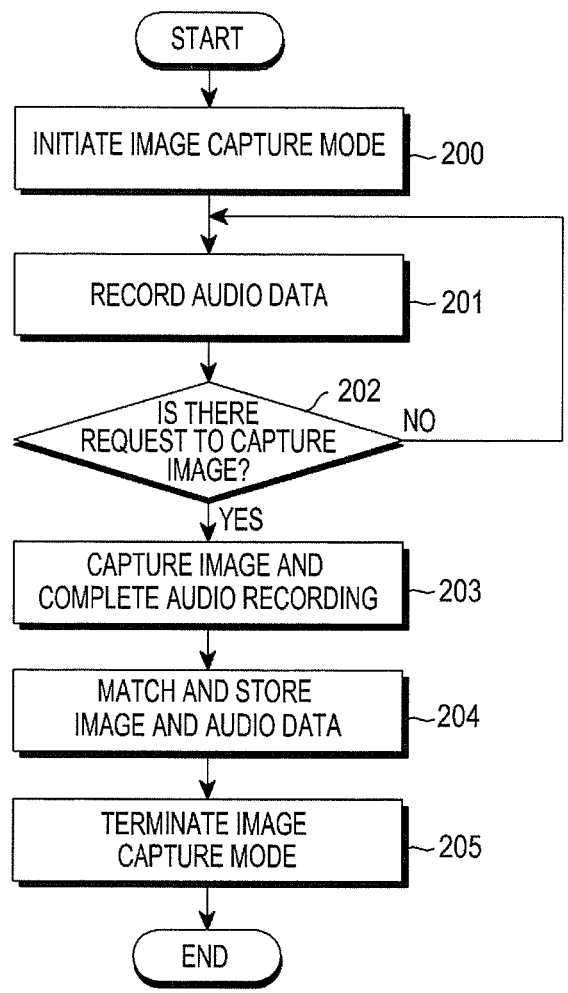
FIG. 2 is a flowchart illustrating a process of capturing an image with audio data according to an embodiment of the present disclosure.

FIG. 2 is a flowchart illustrating a process of capturing an image with audio data, according to an embodiment of the present disclosure.

The controller 10 initiates an image capture mode, in step 200. The image capture mode means a mode to store an image captured by the camera unit 10 with audio data.

The controller 10 records audio data in step 201. More specifically, the controller 10 processes an audio signal input through the audio I/O unit 20 into audio data and stores the audio data in the audio buffer of the storage 60. The controller 10 determines whether there is a request to capture an image in step 202, and if yes, proceeds to step 203, or if no, keeps recording audio data in step 201.

In step 203, the controller 10 captures an image and completes audio recording. Specifically, the controller 10 stops storing audio data in the audio buffer.

In step 204, the controller 10 matches and stores the captured image with the recorded audio data. For example, where the captured image is in a JPEG file format, the controller 10 can store the image data by including position information of the recorded audio data in an EXIF field within the header field of the JPEG file format of the image.

In step 205, the controller 10 terminates the image capture mode.

Figure 3:
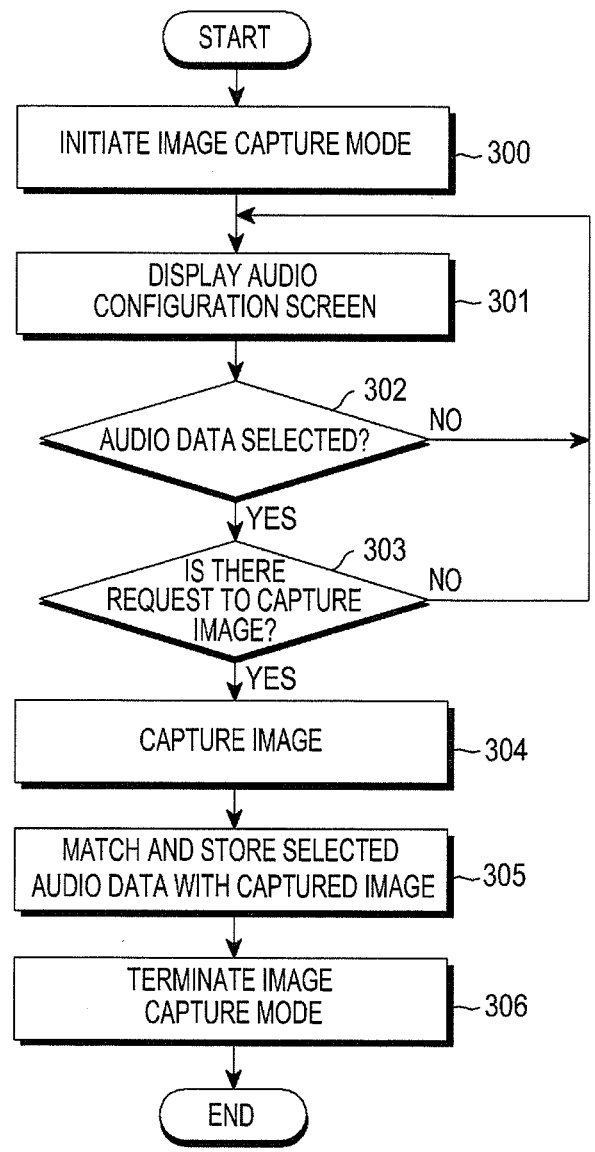
FIG. 3 is a flowchart illustrating a process of capturing an image with audio data according to another embodiment of the present disclosure.

FIG. 3 is a flowchart illustrating a process of capturing an image with audio data, according to another exemplary embodiment of the present disclosure.

In step 300, the controller 10 initiates an image capture mode.

In step 301, the controller 10 displays an audio configuration screen in the display unit 50. The audio configuration screen includes a menu screen for recording audio data before an image is captured and another menu screen for adding any of one or more pieces of audio data.

In step 302, the controller 10 determines whether audio data has been selected, and if yes, proceeds to step 303 or if no, keep displaying the audio configuration screen in step 301.

In step 303, the controller 10 determines whether there has been an image capture request, and if yes, proceeds to step 304, or if no, keeps displaying the audio configuration screen in step 301.

Then, the controller 10 captures an image in step 304, and matches and stores the captured image with the selected audio data in step 305.

In step 306, the controller 10 terminates the image capture mode.

Figure 4:
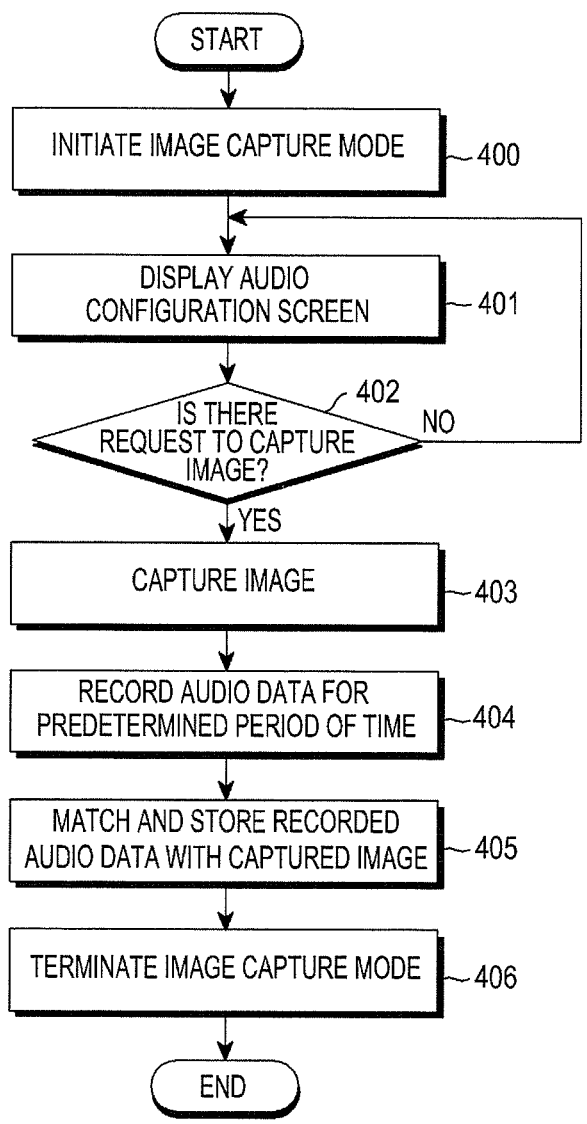
FIG. 4 is a flowchart illustrating a process of capturing an image with audio data according to yet another embodiment of the present disclosure.

FIG. 4 is a flowchart illustrating a process of capturing an image with audio data, according to yet another exemplary embodiment of the present disclosure.

In step 400, the controller 10 initiates an image capture mode.

In step 401, the controller 10 displays an audio configuration screen. The audio configuration screen can include a menu screen for recording audio data before an image is captured, another menu screen for adding any of one or more pieces of audio data, and optionally a further menu screen for recording audio data after the image is captured.

Consequently, the controller 10 determines whether there has been an image capture request in step 402, and if yes, proceeds to step 403, or if no, keeps displaying the audio configuration screen in step 401.

Then, the controller 10 captures an image in step 403, and records audio data for a certain period of time in step 404. The controller 10 stores the recorded audio data in the audio buffer.

In step 405, the controller 10 matches and stores the audio data stored in the audio buffer with the captured image.

In step 406, the controller 10 stops the image capture mode.

Figure 5:
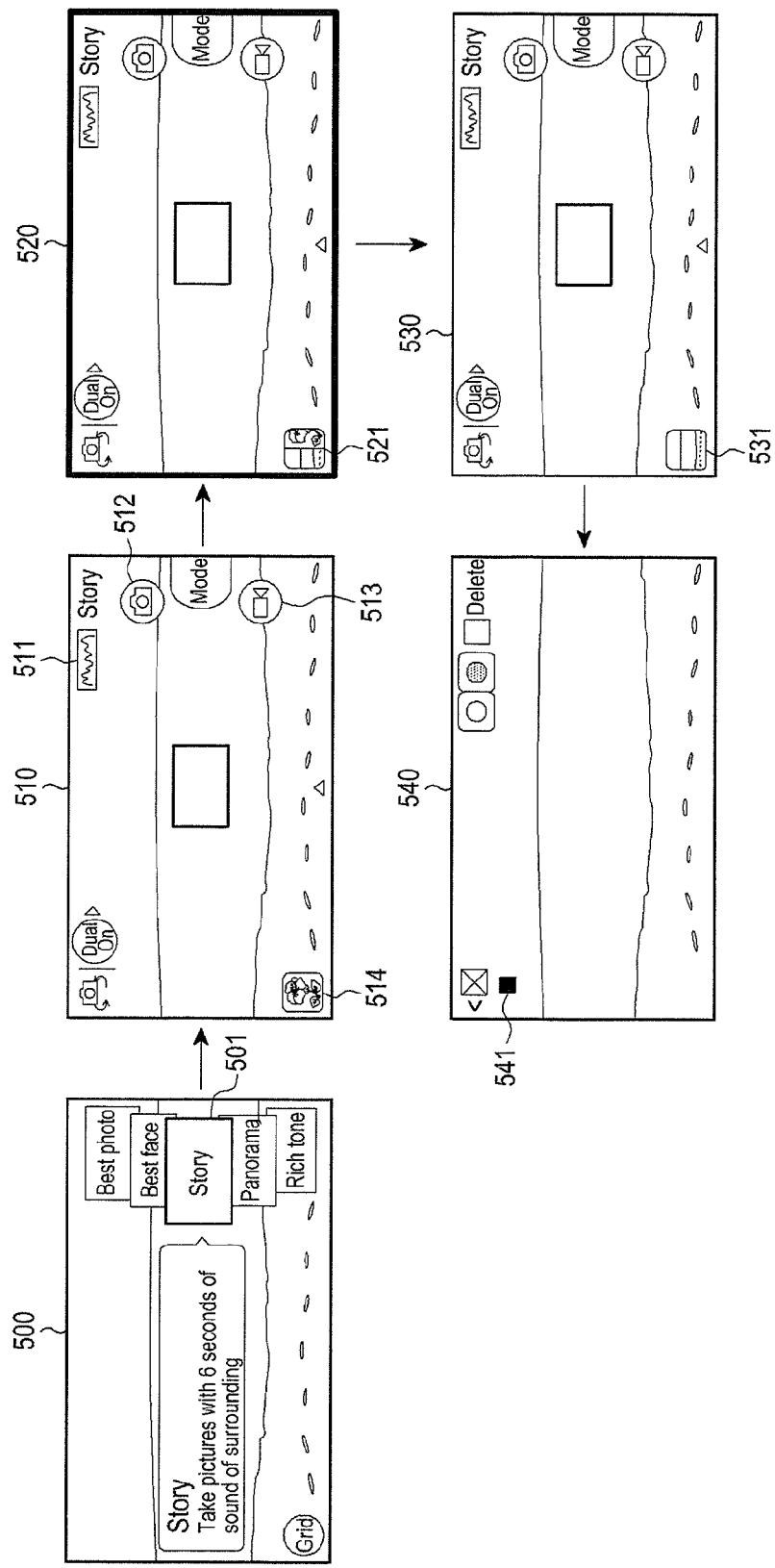
FIG. 5 illustrates a process of capturing an image with audio data according to an embodiment of the present disclosure.

FIG. 5 illustrates a process of capturing an image with audio data, according to an exemplary embodiment of the present disclosure.

In the exemplary embodiment, it is illustrated that audio data is recorded in an image capture mode and the recorded audio data and a captured image are matched and stored.

If the image capture mode is initiated, the controller 10 displays a photography configuration screen as shown by reference numeral 500. The photography configuration screen includes a story menu 501 for capturing an image with audio data. In an exemplary embodiment of the present disclosure the story menu 501 enables image capturing while enabling 6 second recording of surrounding sound, but the recoding time can vary in other exemplary embodiments.

If the story menu 501 is selected, the controller 10 displays a preview screen as shown by reference numeral 510. At the same time, the controller 10 starts recording audio data and can further display a recording indicator 511 to indicate that recording is in progress in the preview screen 510. In addition to the recording indicator 511, the preview screen 510 further includes an icon 512 to capture an image, an icon 513 to capture a video image, and a preview image 514 for displaying an image before capturing.

When the icon 512 to capture an image is selected, the controller 10 captures an image, completes audio recording, and stores the captured image and the recorded audio data. At this time, the preview image 514 is turning to a preview image 521 that displays the captured image, as shown in a screen 520. The controller 10 then displays the captured image in the preview image 531, as shown in a screen 530. In this regard, the controller 10 can set shutter sound to be silent to ensure that the shutter sound does not happen to be recorded in recording audio data.

The controller 10 displays the captured image with an indicator 541 to indicate that there is audio data matched and stored with the image, as shown in a screen 540. The controller 10 can display the captured image and simultaneously reproduce the audio data. Alternatively, the controller 10 can reproduce the audio data on request.

Figure 6:
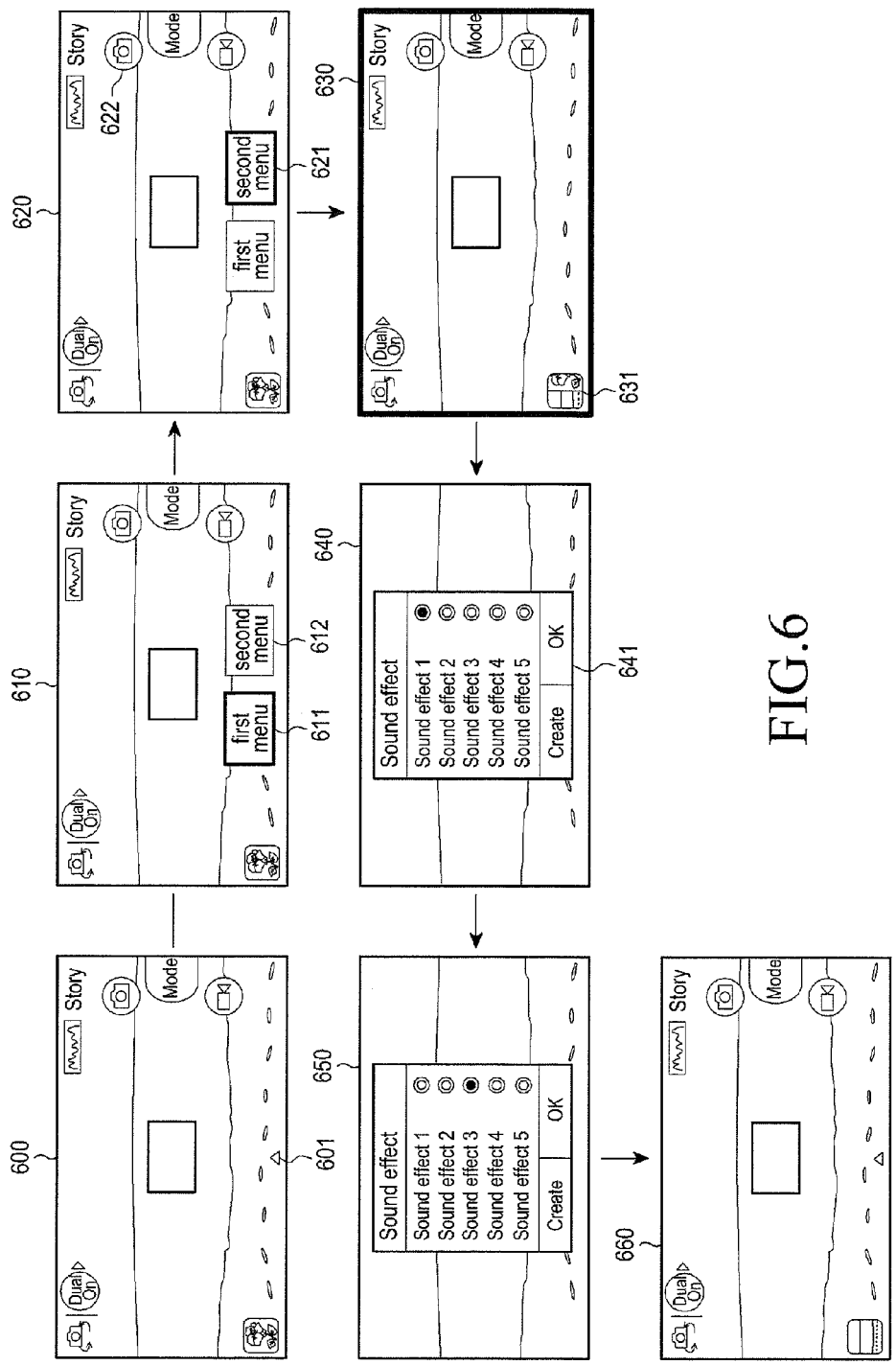
FIG. 6 illustrates a process of capturing an image with audio data according to another embodiment of the present disclosure.

FIG. 6 illustrates a process of capturing an image with audio data, according to another exemplary embodiment of the present disclosure.

In the embodiment, it is illustrated that a piece of audio data selected from among one or more pieces of audio data and a captured image are matched and stored with each other.

If an icon 601 to display a menu for recording audio data or adding audio data is selected in a capture screen, represented by reference numeral 600, the controller 10 displays a first menu 611 for recording audio data before image capturing and a second menu 612 for adding any one of the one or more pieces of audio data is selected together, as shown in a screen 610.

If, in a screen 620, a second menu 621 for adding audio data is selected and then an image capture icon 622 is selected, the controller 10 captures an image and has a preview image 631 turn to the captured image, as shown in a screen 630.

Subsequently, the controller 10 displays a menu screen 641 for selecting one or more pieces of audio data, represented as respective sound effects, as shown in a screen 640. The menu screen 641 can display a menu screen for selecting one or more pieces of audio data with various sound effects applied thereto.

If a piece of audio data is selected as shown in a screen 650, the controller 10 matches and stores the selected audio data with the captured image, and displays the captured image with the selected sound effect, as shown in a screen 660.

Figure 7:
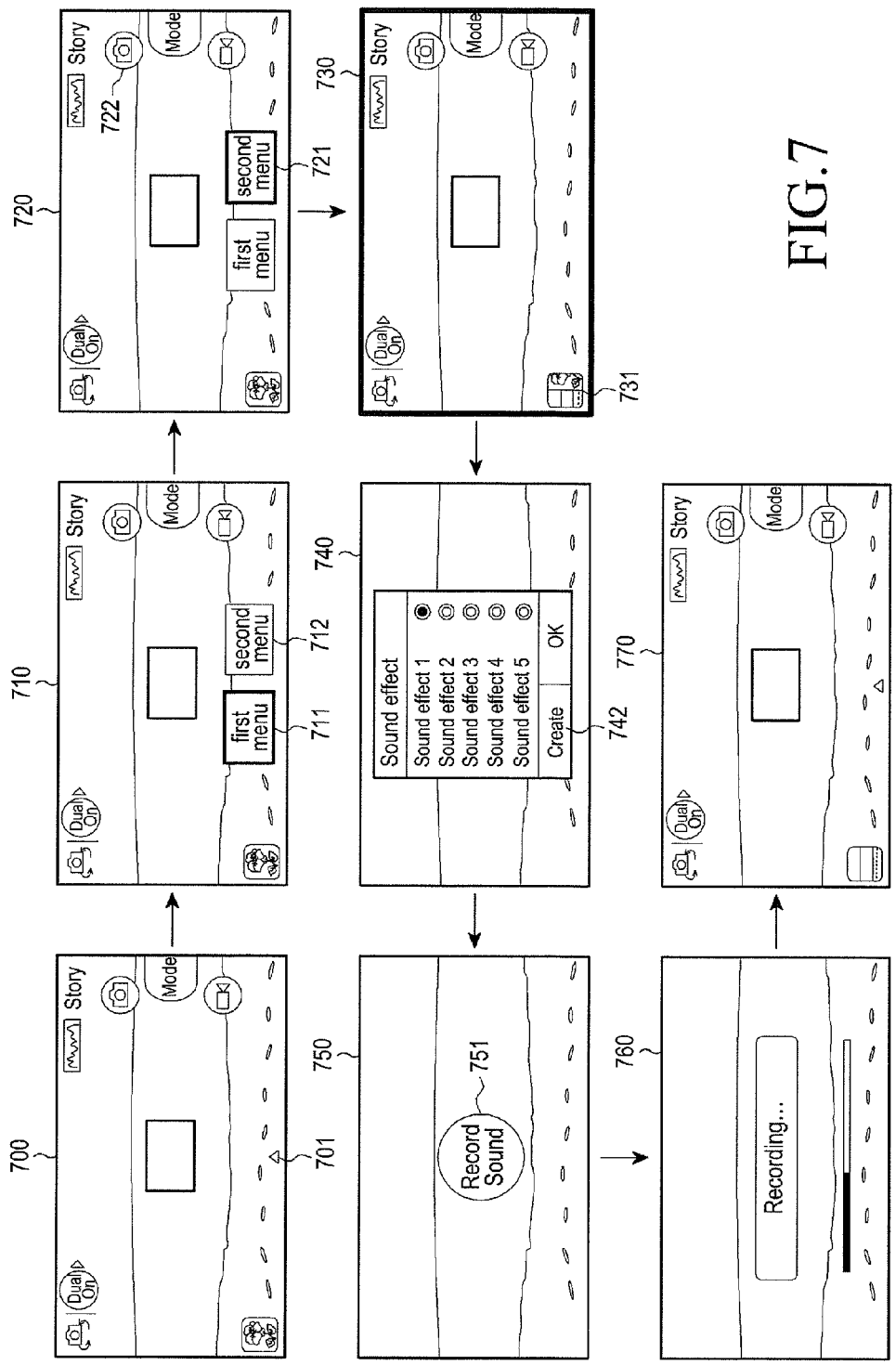
FIG. 7 illustrates a process of capturing an image with audio data according to yet another embodiment of the present disclosure.

FIG. 7 illustrates a process of capturing an image with audio data, according to yet another exemplary embodiment of the present disclosure.

In the exemplary embodiment, it is illustrated that audio data is recorded for a certain time after an image is captured and the recorded audio data is matched and stored with the captured image.

If, in a capture screen 700, an icon 701 to display a menu for recording audio data or adding audio data is selected, the controller 10 displays a first menu 711 for recording audio data before image capturing and a second menu 712 for recording audio data after image capturing together in a capture screen 710. If, in a capture screen 720, a second menu 721 for recording audio data after image capturing is selected and then an image capture icon 722 is selected, the controller 10 captures an image and has a preview image 731 turn to the captured image, as shown in a screen 730.

Upon completion of capturing an image, the controller 10 displays a recording start menu in a screen 740. If a recording start button 742 to create audio data, which is expressed as 'create', is clicked, an icon 751 for audio recording is displayed as shown in a screen 750.

If the icon 751 is selected, the controller 10 indicates that audio data recording is in progress while recording audio data, as shown in a screen 760.

Upon completion of the audio recording, the controller 10 matches and stores the recorded audio data with the captured image in the storage 60 and displays the captured image with corresponding audio data, as shown in a screen 770.

In exemplary embodiments of the present disclosure, a configuration screen can further be displayed in order for the user to select an audio data segment from the recorded audio data so that the audio data segment is matched and stored with the captured image. Specifically, when audio data is selected, the controller 10 can further display the configuration screen for the user to select a time segment of the selected audio data, and match and store part of the audio data that corresponds to the selected time segment with the captured image.

Furthermore, in other embodiments of the present disclosure, it is determined in advance that audio data should be recorded while in an image capture mode, and thus audio recording can be performed even in a dual camera capture mode, a panorama capture mode, or any other different image capture mode without need to set or enter a separate audio recording mode.

Figure 8:
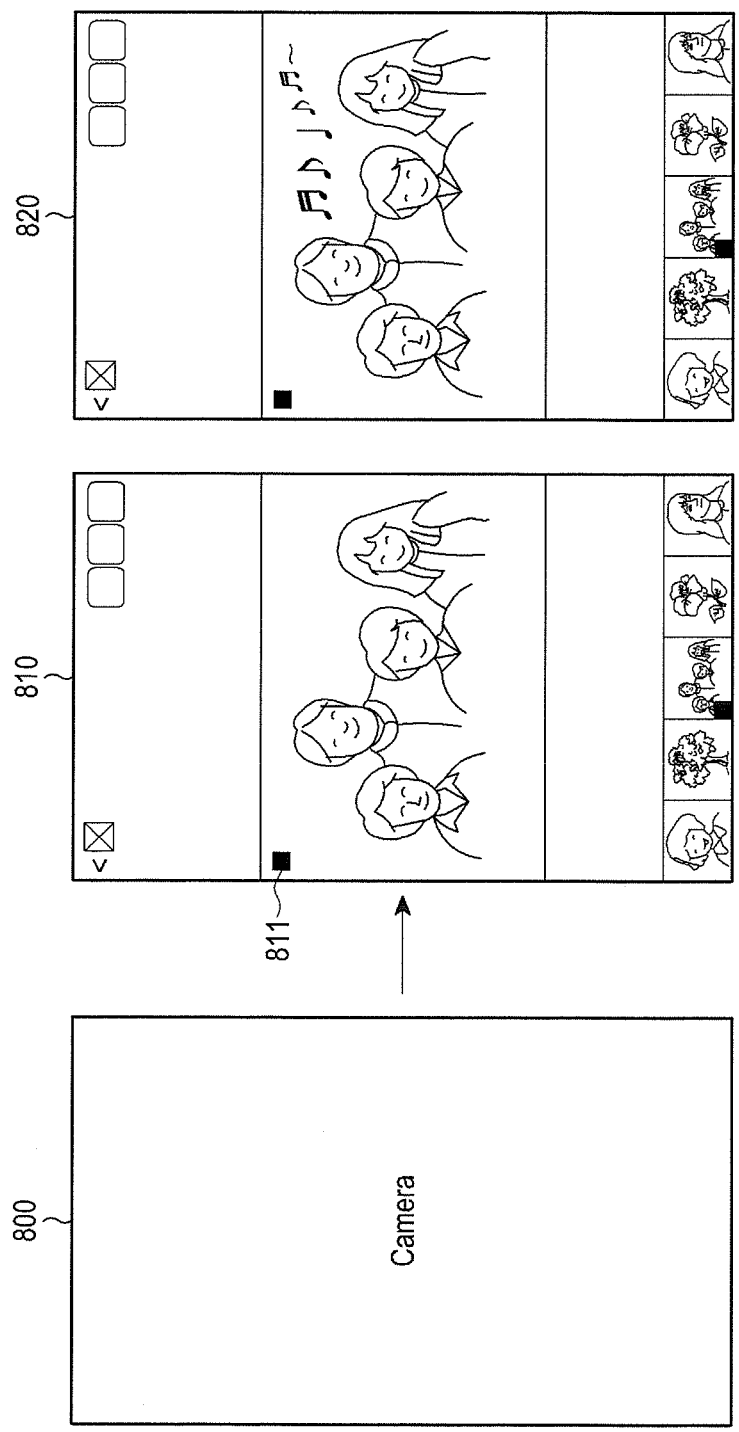
FIGS. 8 and 9 illustrate processes of presenting captured images according to embodiments of the present disclosure.
Figure 9:
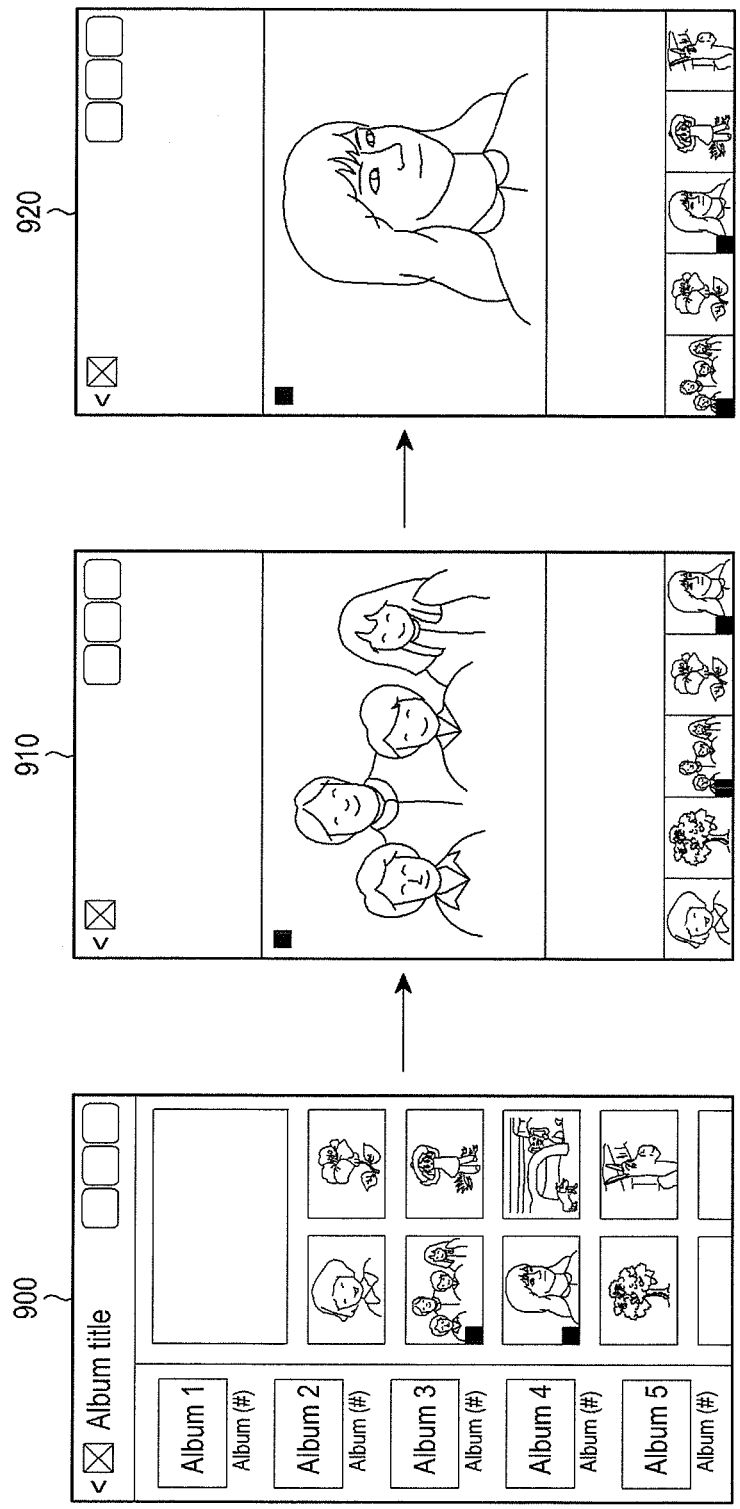

FIGS. 8 and 9 illustrate processes of presenting captured images, according to exemplary embodiments of the present disclosure.

FIG. 8 illustrates how to display a captured image in a camera mode, according to an exemplary embodiment of the present disclosure, and FIG. 9 illustrates how to display a captured image from a photo album menu, according to an exemplary embodiment of the present disclosure.

Referring to FIG. 8, in a camera capture screen 800, if requested to display a captured image, the controller 10 displays preview images of one or more captured images and a preview screen of a selected image as shown in a screen 810. In this case, if the selected image is an image matched and stored with audio data, the controller 10 can display an indicator 811 to indicate that the image has the corresponding audio data. Also, if requested to reproduce the audio data, the controller 10 reproduces the audio data matched and stored with the image through the audio I/O unit 20. Such a request to reproduce audio data can be a touch input on the screen in which the image is displayed, or a selection of a separate menu to reproduce audio data.

In another exemplary embodiment, the controller 10 displays an image matched and stored with audio data while reproducing the audio data through the audio I/O unit 20, as shown in a screen 820.

Referring to FIG. 9, in displaying a photo album menu as shown in a screen 900, the controller 10 can display an indicator in a preview image of an image with audio data to indicate that the image has audio data. If a preview image with the indicator is selected from among those preview images, the controller 10 reproduces audio data matched and stored with the selected image while displaying the selected image, as shown in a screen 910. If the user selects another preview image with the indicator, the controller 10 reproduces audio data matched and stored with the selected image while displaying the selected image, as shown in a screen 920.

In performing a slide show using one or more images included in a photo album, the controller 10 can set a time frame within which to show an image with the indicator, i.e., with audio data, to be longer than a predetermined time frame set to show each image included in the photo album. For example, if the time frame set to show each image is 3 seconds in the slide show, the time frame for an image with audio data can be set to be 6 seconds. The time frame can vary in other exemplary embodiments. With a music player being played in the apparatus, the controller 10 ensures an image with corresponding audio data to be displayed without reproducing the audio data.

Figure 10:
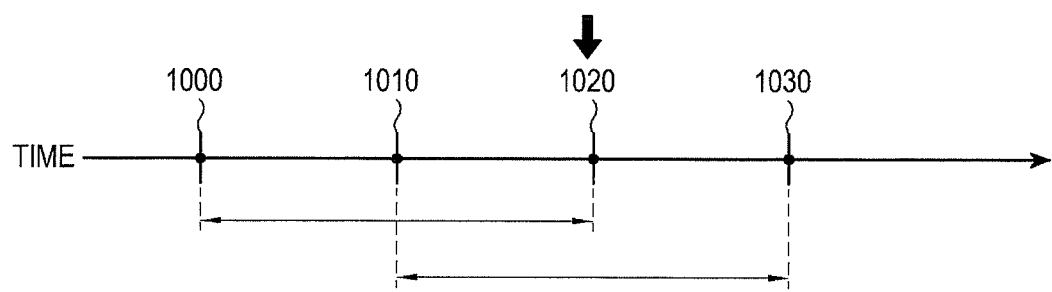
FIG. 10 illustrates image capture and audio recording points in time based on which to store audio data, according to an embodiment of the present disclosure.

FIG. 10 illustrates image capture and audio recording points in time based on which to store audio data, according to an embodiment of the present disclosure.

Referring to FIG. 10, audio recording is initiated at a point 1000 and image capturing starts at a point 1020 in time.

Figure 11:
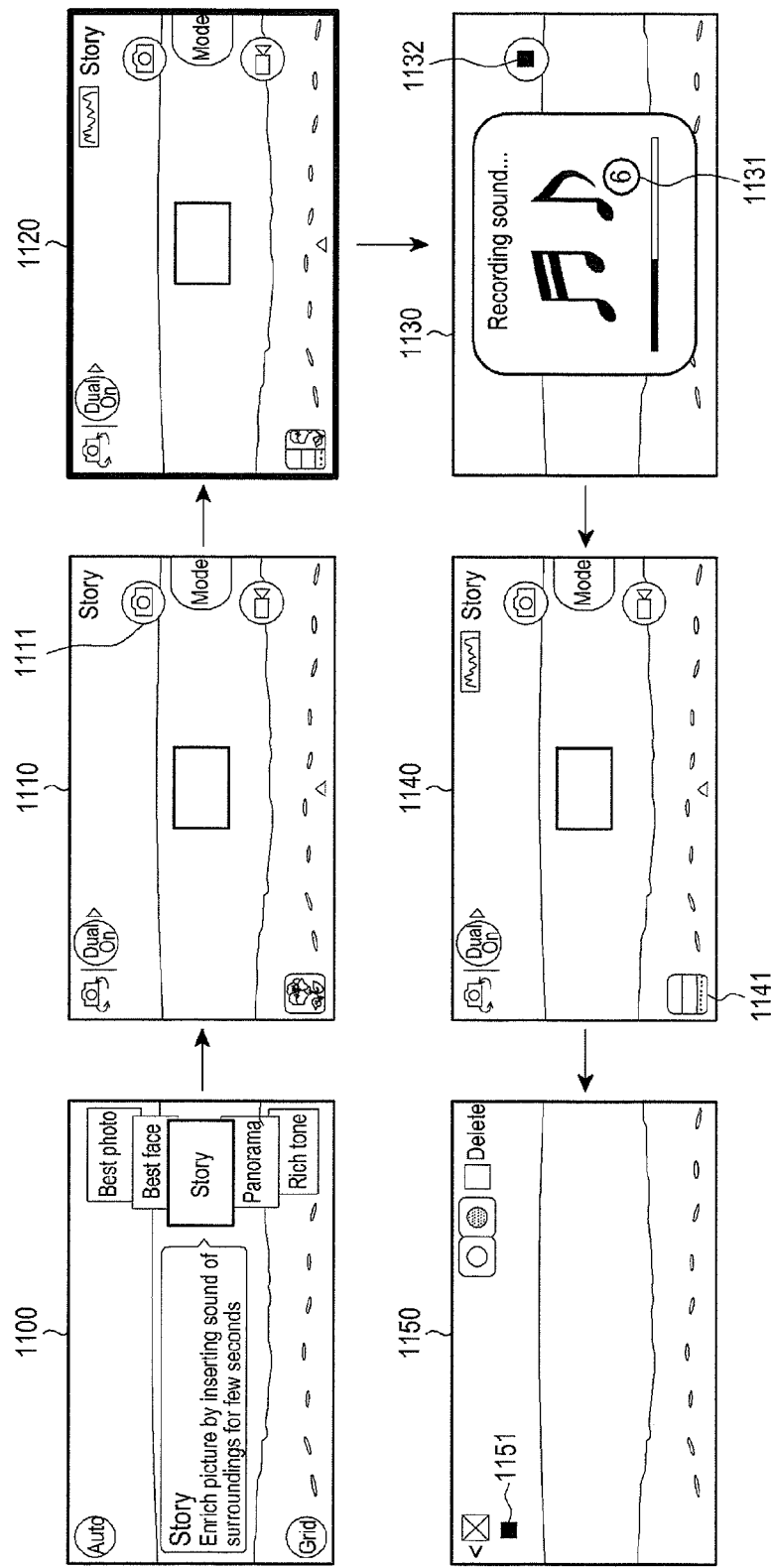
FIG. 11 illustrates a process of capturing an image with audio data, according to yet another embodiment of the present disclosure.

If an image capture mode is initiated, the controller 10 starts recoding audio from the point 1000, and if an image is captured on request at the point 1020, the controller 10 stores audio data recorded from the point 1000 to the point 1020. Alternatively, the controller 10 can also store audio recorded from the point 1010 to a point 1030 in somewhere after completion of image capturing. The audio recording time can also vary in other embodiments. For example, if the audio recording time is set to be 6 seconds, the controller 10 can extract audio data recorded for 6 seconds before starting to capture an image at point 1020 and matches and stores the extracted audio data with the captured image. Alternatively, in other embodiments, the controller 10 can extract audio data recorded for 3 seconds before and 3 seconds after starting to capture an image at the point 1020, and matches and store the extracted audio data with the image FIG. 11 illustrates a process of capturing an image with audio data, according to yet another embodiment of the present disclosure.

When the image capture mode is initiated, the controller 10 displays a photography configuration screen 1100. The photography configuration screen includes a story menu for capturing an image with audio data. In an embodiment of the present disclosure the story menu enables image capturing while enabling 6 second recording of surrounding sound, but the recoding time can vary in other embodiments.

If the story menu is selected, the controller 10 displays a capture screen 1110.

If an image capture icon 1111 is selected, the controller 10 captures an image and simultaneously, a preview image on the bottom left corner is turning to the captured image, as shown in a screen 1120.

The controller 10 then starts recoding audio data and displays an indicator screen to indicate that audio recording is in progress. In the indicator screen, the controller can display an indicator 1131 to count down the recording time. For example, if a predetermined recording time is 6 seconds, the indicator 1131 can count down the recording time and display numbers sequentially, e.g., from 6 to 0. The controller further displays an icon 1132 for the user to stop recording audio data.

If a preview image 1141 of the captured image is selected as shown in a screen 1140, the controller 10 displays the captured image in full screen with an indicator 1151 to indicate that the captured image has corresponding audio data, as shown in a screen 1150. The controller 10 can display the captured image while reproducing the corresponding audio data. Alternatively, the controller 10 can also reproduce the audio data on request.

Although in the embodiment audio data is recorded after image capturing, in other embodiments the controller 10 records audio data as soon as initiating the image capture mode and can display a screen for capturing an image after counting down a predetermined recording time. In other words, the controller 10 can capture an image after completion of recording, and match and store the captured image with the recorded audio data.

As such, with a function of recording audio data in capturing an image and matching and storing the recorded audio data with the captured image, according to embodiments of the present disclosure, the user can more lively record a scene from which an image is captured.

It will be appreciated that the embodiments of the present disclosure can be implemented in a form of hardware, software, or a combination of hardware and software. The software can be stored as program instructions or computer readable codes executable on the processor on a computer-readable medium. Examples of the computer readable recording medium include magnetic storage media (e.g., ROM, floppy disks, hard disks, and the like), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The embodiments can be implemented by a computer or portable terminal including a controller and a memory, and the memory can be an example of the computer readable recording medium suitable for storing a program or programs having instructions that implement the embodiments of the present disclosure. The present disclosure can be implemented by a program having codes for embodying the apparatus and method described in claims, the program being stored in a machine (or computer) readable storage medium. The program can be electronically carried on any medium, such as communication signals transferred via wired or wireless connection, and the present disclosure suitably includes its equivalent.

The image capture terminal can receive and store the program from a program provider wiredly/wirelessly connected thereto. The program provider can include a memory for storing programs having instructions to perform the embodiments of the present disclosure, information necessary for the embodiments of the present disclosure, and the like, a communication unit for wired/wirelessly communicating with the image capture terminal, and a controller for sending the program to the image capture terminal on request or automatically.

Although the present disclosure has been described with an embodiment, various changes and modifications may be suggested to one skilled in the art. It is intended that the present disclosure encompass such changes and modifications as fall within the scope of the appended claims.

What is claimed is:

1. An apparatus for capturing an image with audio data, the apparatus comprising:
    a camera unit configured to capture an image;
    an audio data recording unit configured to record audio data; and
    a controller configured to:
        store, in a memory, the captured image associated with corresponding recorded audio data; and
        display, on a screen, an indicator in a preview image of the captured image to indicate that the captured image has the corresponding recorded audio data.

2. The apparatus of claim 1, wherein the controller is configured to extract the corresponding recorded audio data recorded for a predetermined period of time prior to the image being captured, from the recorded audio data, and store the extracted corresponding recorded audio data and the captured image in the memory.

3. The apparatus of claim 1, wherein the controller is configured to extract the corresponding recorded audio data recorded for a predetermined period of time after the image is captured, from the recorded audio, and store the extracted corresponding recorded audio data and the captured image in the memory.

4. The apparatus of claim 1, wherein the controller is configured to reproduce the corresponding recorded audio data through a speaker while displaying the captured image on the screen.

5. An apparatus for capturing an image with audio data, the apparatus comprising:
    a camera unit configured to capture an image;
    an audio data recording unit configured to record audio data; and
    a controller configured to:
        store, in a memory, the captured image associated with corresponding audio data recorded for a predetermined period of time after the camera unit captured the image;
        display, on a screen, an indicator in a preview image of the captured image to indicate that the captured image has the corresponding audio data.

6. The apparatus of claim 5, wherein the controller is configured to display a timer to count down the predetermined period of time on the screen while recording the corresponding audio data.

7. The apparatus of claim 5, wherein the controller is configured to reproduce the corresponding audio data through a speaker while displaying the captured image on the screen.

8. A method for capturing an image with audio data, the method comprising:
    recording audio data from an audio recording unit;
    capturing an image in response to receiving a user's request;
    storing, in a memory, the captured image associated with corresponding audio data; and displaying, on a screen, an indicator in a preview image of the captured image to indicate that the captured image has the corresponding audio data.

9. The method of claim 8, further comprising:
extracting the corresponding audio data recorded for a predetermined period of time prior to the image being captured, from the recorded audio; and
storing the extracted corresponding audio data and the captured image in the memory.

10. The method of claim 8, further comprising:
extracting audio data recorded for a predetermined period of time after the image is captured, and
storing the extracted audio data and the captured image in the memory.

11. The method of claim 8, further comprising:
reproducing the corresponding audio data through a speaker while displaying the captured image on the screen.

12. A method for capturing an image with audio data, the method comprising:
capturing an image from a camera;
recording corresponding audio data for a predetermined period of time after the image is captured, from a microphone; and
storing, in a memory, the captured image associated with the corresponding audio data; and
displaying, on a screen, an indicator in a preview image of the captured image to indicate that the captured image has the corresponding audio data.

13. The method of claim 12, further comprising:
displaying a timer to count down the predetermined period of time on the screen.

14. The method of claim 13, wherein the timer appears while recording the corresponding audio data.

15. The method of claim 12, further comprising:
reproducing the corresponding audio data through a speaker while displaying the captured image on the screen.

16. The method of claim 12, further comprising:
recording audio from a microphone; and
extracting the corresponding audio data recorded for a predetermined period of time prior to the image being captured, from the recorded audio.

* * * * *